United States Patent Office 2,894,917
Patented July 14, 1959

2,894,917

CARBOXYLIC ACID TYPE CATION EXCHANGE RESINS OF LARGE DIMENSIONS

Yoshio Tsunoda, Shibuya-ku, Tokyo, Maomi Seko, Okatomi, Nobeoka-shi, and Masaaki Watanabe, Ryo Ehara, and Teruyuki Misumi, Tsunetomi, Nobeoka-shi, Japan, assignors to Asahi Kasei Kogyo Kabushiki Kaisha, Osaka, Japan No Drawing. Application April 16, 1956
Serial No. 578,162

Claims priority, application Japan April 20, 1955

7 Claims. (Cl. 260—2.2)

This invention relates to carboxylic acid type cation exchange resin of large dimensions which is not fractured in the step of their preparation. This invention relates particularly to carboxylic acid type cation exchange resin which comprises monovinyl compound having carboxylic acid groups or carboxylic acid ester groups and other monovinyl compound and polyolefinic compound, said carboxylic acid ester groups being hydrolyzed after polymerization. This invention relates more particularly to the composition and the preparation of base polymer matrix of the carboxylic acid type cation exchange resin, said matrix which comprises monovinyl compound of carboxylic acid groups being cation exchange resin in itself and said matrix which comprises monovinyl compound of carboxylic acid ester groups being hydroylsed after polymerisation. This invention further relates particularly to carboxylic acid type cation exchange resin having at least two dimensions each in excess of 1 cm. which is not fractured in any steps of preparation such as polymerization, hydrolysis and any other chemical treatments.

In general, conventional carboxylic acid type cation exchange resin was prepared by the followin process. For example, according to U.S. Patent Nos. 2,304,111 and 2,597,437, compounds having carboxylic acid groups or carboxylic acid ester groups and one polymerizable double bond and polyolefinic compounds were copolymerized. When the former monomeric compound has carboxylic acid groups, cation exchange active groups of the acid groups were naturally introduced to the resultant polymer matrix, but when the former monomeric compound has carboxylic acid ester groups, the carboxylic acid ester groups were changed into carboxylic acid groups by hydrolysis and then the acid groups acted as cation exchange active group of the polymer matrix.

Preparation of ion exchange resin having at least two dimensions each in excess of 1 cm. by the conventional processes was failed with occurrence of cracks in the resin. Copolymerization of monovinyl compound having carboxylic acid groups or carboxylic acid ester groups and polyolefinic compound; hydrolysis of acid ester groups bonded to base polymer matrix into acid groups, in case one of monomers was monovinyl compound having carboxylic acid ester groups; and removal and washing of chemical reagents after the hydrolysis caused such disadvantage.

We have now found a new base polymer matrix of large dimensions which are not fractured in the preparation thereof, ion exchange resin having far superior electrochemical properties made therefrom and the process of manufacturing the same.

According to the present invention, monovinyl monomeric compound not having COOR radical, R being a substituent selected from the group of hydrogen, halogen, univalent alkyl radicals, univalent arene radicals, univalent aralkyl radicals and univalent alkaryl radicals, such as, for example, styrene, α-methylstyrene, ar-methylstyrene, ar-chlorostyrene, ar-ethylvinylbenzene, vinylnaphthalene, vinylidene chloride, vinyl chloride, methylvinylketone, methylvinylether, acrylonitrile and vinyl acetate, is first partially polymerized. The partial polymerizate is in a state of a solution consisting of the monomer and the polymer thereof. Monovinyl monomer having COOR radical and crosslinking agents such as polyolefinic compound are then added to the solution with or without additional of the monovinyl monomers not having COOR radical. A transparent uniform mixed solution thus obtained is completely polymerized, to form base polymer matrix of cation exchange resin. When monovinyl monomer having carboxylic acid ester groups is employed, the complete polymerized product is further hydrolyzed to convert the carboxylic acid ester group into free form. When monovinyl compound having carboxylic acid groups is used, the complete polymerzide polymerizate is cation exchange resin in itself. Thus obtained cation exchange resin is never cracked throughout its preparation however large the dimensions are. Such base polymer matrix shows properties quite different from any of the conventional base polymer matrix. For example, the base polymer matrix obtained by the present invention is not fractured by washing or hydrolysis after the polymerization. The mechanical properties such as flexibility of the present polymer are superior to those of the known one. Whereas base polymer matrix prepared for example, from monovinyl compounds having carboxylic acid ester groups and divinylbenzene is transparent, the present polymer made of the same monomers is turbid and opaque. When the conventional granular carboxylic acid type cation exchange resin is immersed into distilled water just after the hydrolysis, the granular resin was finely fractured. Therefore, in order to prevent the fracture of the resin, the carboxylic acid type cation exchange resin had to be first immersed into a concentrated salt solution and the concentration of said salt solution had to be gradually reduced. The larger the dimensions of the carboxylic acid type cation exchange resin prepared by the known method, the more was the accumulation of strains caused by swelling and contraction, and the more easily was the resin fractured. On the contrary, even when the resin of this invention is immersed into distilled water just after the hydrolysis, it is not fractured nor cracked at all. Such important differences in physical and chemical properties make the present resin clearly distinguished from the conventional one. The present base polymer matrix may be in the form of membrane, bar, rod and any other shape. So does the resin produced from the matrix.

The concrete method of this invention is as follows. Monovinyl compound not having COOR radical is partially polymerized. Monovinyl compound having COOR radical and polyolefinic compound are mixed in the solution containing partial polymerizate with or without addition of the monovinyl compound not having COOR radical. Other inert material such as reinforcing materials may be mixed therein. This mixed solution is completely polymerized until an insoluble and infusible cross-linked base polymer matrix is formed.

The inert materials may be added in the process of the partial polymerization. Catalyst may be used to accelerate the polymerizations. Instead of the partial polymerizate, a solution of the monovinyl compound not having COOR radical containing the polymer thereof may be used. The polymer thus obtained can be used as base polymer matrix for carboxylic acid type cation exchange resin. When the base polymer matrix is prepared from monomeric compound having COOR radical, the matrix is hydrolyzed until the COOR radical are altered to COOH radical. Whichever case, when monovinyl compound not having COOR radical is first partially polymerized and to the resultant product is added monovinyl compound having COOR radical, with or without the addition of the monovinyl compound not having COOR radical, the base polymer matrix in block form is obtained without any cracking or fracture in the steps of the preparation, such as polymerization, introduction of ion exchange groups or chemical treatment of swelling and shrinking. Therefore, carboxylic acid type cation exchange resin of any shape and size can be prepared. If a plasticizer is added in the polymerizing step as an inert substance, the finally obtained base polymer matrix can easily be worked into any shape. Monovinyl compound having COOR radical employed in the process of preparing carboxylic acid type cation exchange resin is represented by the following general formulae:

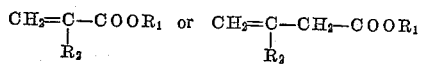

or

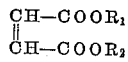

wherein $R_1$ and $R_2$ indicate hydrogen, halogen, univalent alkyl radicals, univalent arene radicals, univalent aralkyl radicals and univalent alkaryl radicals. Examples of the compounds are maleic acid, acrylic acid, methacrylic acid, α-chloracrylic acid, α-bromacrylic acid, α-phenylacrylic acid, ethylacrylic acid, α-tolylacrylic acid, α-cyclopentylacrylic acid, α-hexylacrylic acid, α-octyl-acrylic acid and their esters. The ester radical is selected from the group consisting of methyl, ethyl, normal propyl, isopropyl, normal butyl, isobutyl, octyl, lauryl and octadecyl groups, their homologues and isomers and arene such as benzyl and phenylethyl. Monovinyl compound not having COOR radical is selected from the group of monovinyl aromatic compounds and monovinyl aliphatic compounds. Said monovinyl aromatic compounds contain 10 or less carbon atoms in the aromatic nucleus and may contain from 1 to 3 halogens or lower alkyl radicals other than tertiary alkyl radicals, preferably methyl, in the the aromatic nucleus. Examples of such monovinyl compounds are styrene, α-methylstyrene, ar-methylstyrene, ar-dimethylstyrene, ar-ethylvinylbenzene, ar-chlorstyrene, vinylnaphthalene, ar-methylnaphthalene, ar-secondary butylstyrene and ar-trimethylstyrene. Examples of monovinyl aliphatic compounds are vinyl chloride, vinylidene chloride, methylvinylketone, methylvinylether and vinyl acetate. Polyolefinic compounds are selected from the compounds having 2 or more polymerizable double bonds, such as divinylbenzene, ar-divinyltoluene, ar-divinylxylene, ar-divinylchlorbenzene, divinylnaphthalene, ar-divinylethylbenzene and divinylether, butadiene, isoprene, bimethallyl, bialiyl, trivinylbenzene, such unsaturated compounds as di-methallylether, dimethallyl sulphide and vinylallylether and such unsaturated compounds as diallyl maleate, chlorallyl crotonate and ethylene dimethacrylate.

In the preparation of the base polymer matrix, the constitution in weight percent of each component based on the total solution mixture is as follows: (I) monoolefinic compound having COOR radical 20–80%, (II) monomeric monovinyl compound not having COOR radical 0–40%, (III) polymer of (II) 1–10% (either as polymer or as the result of partial polymerization), (IV) polyolefinic compound 3–10%, (V) plasticizer be employed. The first partial polymerization takes place at 25° to 150° C., preferably in an atmosphere free from oxygen. Monovinyl compound having COOR radical and polyolefinic compound are added to the intermediate partial polymer solution, and mixed thoroughly to form a uniform solution, and finally polymerized to produce the desired base polymer matrix. The catalyst which may be used in both polymerizations is benzoyl peroxide, lauroyl peroxide, hydrogen peroxide, potassium peroxydisulphate, sodium perborate or ammonium persulphate. The final polymerization may be carried out so as to facilitate the production of a plate or a bar like polymer. A plasticizer may be added as an inert material in any step of the process. The plasticizer used here is a usual one such as an aromatic or aliphatic compound. The polymer containing the plasticizer can readily be cut into sheet. The addition of plasticizer has other advantages in this invention. In the step of dissolving polymer into monomer, the presence of plasticizer helps the dissolution of polymer to dissolve easily and also in the step of polymerization, its presence controls smoothly the rate of polymerization. The plasticizer may be extracted, if desired, from the sheet by using a proper solvent. Thus, an insoluble and infusible base polymer matrix containing carboxylic acid groups or carboxylic acid ester groups can be made in any shape and size. A reinforcing material for the finished polymer, such as fillers or webs, may be added.

When a monomer having COOH radical is used, the polymer matrix thus obtained has naturally cation exchange active groups. On the other hand, when a monomer having a carboxylic acid ester group is used, base polymer matrix has to be hydrolyzed. As the hydrolyzing reagent, strong acid such as concentrated hydrochloric acid, concentrated hydroiodic acid, hydrofluoric acid, nitric acid, sulfuric acid or phosphoric acid is used. The hydrolysis is carried out at a relatively high temperature under the normal pressure. The hydrogen halide may be used to form an azeotropic state with water under relatively high pressure. The solution of various acids such as sulfuric acid and paratoluol sulfonic acid in an aqueous acetic acid solution is also used. The basic hydrolyzing agents are selected from an aqueous or an alcoholic solution of strong basic material such as caustic soda, caustic potash or ammonium hydroxide. An alcoholic solution of 5 to 8% caustic potash or an aqueous solution of 2 to 15% caustic potash is most preferable. The hydrolysis is carried out at 30° to 200° C. When the polymer is swollen in a suitable solvent, it can easily be hydrolyzed. The solvents such as acetone, ethylene dichloride, benzene, dioxane or chlorbenzene are used, and they will not be attacked by the hydrolyzing reagents. In this hydrolysis, usually 100% of carboxylic acid ester groups is hydrolyzed. However, instead of the total hydrolysis of the carboxylic acid ester groups, a part of said groups may be hydrolyzed to change the electrochemical properties of the ion exchange resin.

In brief, preparation of crack-less carboxylic acid type cation exchange resin having at least two dimensions each in excess of 1 cm. according to this invention, comprises the steps in which monovinyl compound not having COOR radical is first partially polymerized, then a monovinyl compound having COOR radical and polyolefinic compound are added to the solution with or without the addition of said monovinyl compound monomer having no COOR radical. On the other hand, the known method is a mere copolymerization of said monomers.

The carboxylic acid type cation exchange resin obtained by this invention is stable irrespective of the dimensions and is not fractured nor cracked by swelling or shrinking in the process of polymerization or hydrolysis. Thus the homogenous carboxylic acid type cation exchange resin having at least two dimensions each in excess of 1 cm. can be obtained.

Examples 1 to 8 illustrate the preparation of a base polymer matrix from monovinyl compound having carboxyl acid ester groups.

*Example 1*

145.6 parts of distilled styrene were partially polymerized in nitrogen at a temperature of 100° C. for 12 hours. This partial polymerisate had a viscosity of about 900 poises and was found as a result of analysis to contain about 25% polymer. 254.4 parts of ethylacrylate, 32 parts of divinylbenzene, 48 parts of ethyl vinylbenzene, 160 parts of dimethyl phthalate as a plasticizer and 0.16 part of benzoylperoxide as a polymerizing catalyst were uniformly mixed therewith. This whole mixture was polymerized at 60° C. for 24 hours, at 80° C. for 24 hours and at 100° C. for 72 hours. Thus white turbid opaque polymer was obtained. This polymer could be easily worked into any shape such as of a plate or bar. On the contrary, when the same monomers were subjected to solution polymerization, cracks were caused during polymerization and polymer of large dimensions could not be obtained.

*Example 2*

The block form polymer obtained by the process mentioned in Example 1 was worked by lathe or planer and polymer of the shape such as sheet, rod or tube was obtained.

*Example 3*

44 parts of distilled styrene were partially polymerized in nitrogen at a temperature of 100° C. for 12 hours. This partial polymerizate had a viscosity of about 900 poises and was found by analysis to contain about 25% polymer. 160 parts of styrene monomer, 196 parts of ethylacrylate, 32 parts of divinylbenzene, 48 parts of ethylvinylbenzene, 160 parts of dimethyl phthalate as a plasticizer and 0.16 part of benzoyl peroxide as a polymerizing catalyst were uniformly mixed therewith. The final polymerization was carried out by the same process as in Example 1.

*Example 4*

11 parts of commercial polystyrene were crushed and dissolved into 33 parts of a distilled styrene monomer. This solution was used instead of the solution containing the partial polymer of styrene used in Examples 1 to 3.

*Example 5*

This example relates to a process of hydrolysis using basic hydrolyzing agent of the base polymer matrix having carboxylic acid ester groups in the preceding Examples 1 to 8. The sheet form polymer matrix having a thickness of 0.7 mm. and an area of 10 cm. x 10 cm. was made by the proccesses mentioned in Examples 1 to 8. In the process of hydrolysis of said polymer matrix, the plasticizer may be removed. 10 sheets of base polymer were put into a reaction vessel provided with a reflux condenser. 80 parts of caustic soda were dissolved into 1000 parts of ethyl alcohol and this solution was poured into the reaction vessel. This solution and sheets were heated at the reflux temperature for 72 hours. After the hydrolysis, the sheets were washed in water. The transport number of the sodium type cation exchange resin membrane in 1.5 N. aqueous solution of sodium chloride at 25° C. was measured. The specific conductivity of this membrane was also measured in 0.5 N. aqueous solution of sodium chloride at 25° C. The results are tabulated in the following:

| | Transport number (percent) of sodium ions in 1.5 N. aqueous solution of sodium chloride | Specific conductivity (mho/cm. × 10³) in 0.5 N. aqueous solution of sodium chloride |
| --- | --- | --- |
| Cation exchange resin of Example 1 | 85 | 7 |
| Cation exchange resin of Example 2 | 84 | 8 |
| Cation exchange resin of Example 3 | 70 | 0.1 |
| Cation exchange resin of Example 4 | 81 | 12 |

As already mentioned in Examples 1 to 4, when ethylacrylate was polymerized with divinylbenzene with or without the addition of styrene by known method, no sheet form polymer of a large area was obtained but only fragment having a thickness of 0.7 mm. and area of 2 cm. x 1 cm. were obtained. When these small sheets were hydrolyzed under the same condition as was mentioned in Example 9, they were fractured in small pieces smaller than about 5 mm. by swelling due to the hydrolysis, and no sheet having a large area was obtained after hydrolysis. The same as in this example, the hydrolysis could be carried out by heating under reflux in an 8% caustic potash alcoholic solution for about 100 hours.

*Example 6*

This example relates to the hydrolysis with an acidic hydrolyzing reagent of base polymer matrix having carboxylic acid ester groups prepared in Examples 1 to 8. The plasticizer was removed from the polymer matrix of Examples 1 to 4 as follows: 10 sheets of sheet form polymer matrix having a thickness of 0.7 mm. and an area of 10 cm. x 10 cm. were put into reaction vessel provided with reflux condenser. Then 1000 parts of concentrated hydroiodic acid of a specific gravity of 1.7 were poured into the reaction vessel. This solution and sheets were heated at the reflux temperature for 100 hours. After the reaction was completed, the sheets were immersed in 1 N. caustic solution for 24 hours, and were washed with water and were stored. The transport number and specific electric conductivity of each cation exchange membrane are as shown in the following table:

| | Transport number (percent) of sodium ions in 1.5 N. aqueous solution of sodium chloride at 25° C. | Specific conductivity 0.5 N. aqueous solution of sodium chloride at 25° C. (mho/cm. ×10³) |
| --- | --- | --- |
| Cation exchange resin of Example 1 | 89 | 6 |
| Cation exchange resin of Example 2 | 89 | 6 |
| Cation exchange resin of Example 3 | 75 | 0.05 |
| Cation exchange resin of Example 4 | 85 | 10 |

The same as in the present example, polymer matrix having carboxylic acid ester groups was soaked in 98% sulfuric acid at 75° C. for 24 hours, and the ester radical was hydrolyzed. Phosphoric acid can be used instead of sulfuric acid.

*Example 7*

To 360 parts of ethylacrylate, 32 parts of divinylbenzene, 48 parts of ethylvinylbenzene, 160 parts of dibutylphthalate as a plasticizer and 0.16 part of benzoyl peroxide as a polymerizing catalyst, were added 40 parts of commercial polystyrene and were uniformly mixed and dissolved. This whole mixed solution was polymerized at 60° C. for 24 hours, at 80° C. for 24 hours and at 100° C. for 72 hours as in Example 1. The polymer thus obtained was hydrolyzed as the same as in preceding Examples 5 and 6.

*Example 8*

145.6 parts of distilled styrene were partially polymerized in nitrogen at 100° C. for 12 hours. This polymer containing solution had a viscosity of about 900 poises and was found by analysis to contain about 25% polymer. 254.4 parts of methylmethacrylate, 32 parts of divinylbenzene, 48 parts of ethylvinylbenzene and 160 parts of dimethylphthalate were added to said solution and were uniformly mixed. This whole mixture was polymerized at 60° C. for 24 hours and further at 80° C. for 24 hours. As mentioned in the preceding examples, sheet form polymer having a thickness of 0.7 mm. and an area of 50 cm. x 50 cm. was obtained. These sheets were opaque and elastic and had no crack. 10 sheets of this sheet form polymer matrix were put into a reaction vessel provided with a reflux condenser. Then 1000 parts of ethanol saturated with caustic soda were put into this reaction vessel. This solution and the sheets were heated at the reflux temperature of the solution for 120 hours. After the hydrolysis, the sheets were washed and stored. The transport number of sodium ions of this cation exchange resin in 1.5-N. aqueous sodium chloride solution at 25° C. was 85%. The specific conductivity in 0.5-N. aqueous sodium chloride solution at 25° C. was $15 \times 10^{-3}$ $\Omega^{-1}$ cm.$^{-1}$. Same as in this example esters of maleic acid, α-chloracrylic acid, α-bromacrylic acid, α-phenylacrylic acid, α-ethylacrylic acid, α-tolylacrylic acid, α-butylacrylic acid, α-ethylphenylacrylic acid, α-cyclopentylacrylic acid, α-hexylacrylic acid and of α-octylacrylic acid could also be used instead of methylmethacrylate in Examples 1 to 7.

Also monovinyl compounds such as vinyltoluene, α-methylstyrene, vinylchlorobenzene, vinylxylene, vinyl chloride, vinylidine chloride, methylvinylether, methylvinylketone and vinyl acetate could also be used instead of styrene in Examples 1 to 7.

What we claim is:

1. A solid unfractured cation exchange resin composition having at least two dimensions each in excess of one cm. and comprising a three dimensionally crosslinked polymer matrix bonded to carboxylic cation exchange groups; said matrix being a polymerization product of a solution mixture of (I) 20–80% by weight of a monoolefinic compound having the structure of

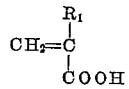

where $R_1$ is a member selected from the group consisting of hydrogen, halogen and methyl radicals (II) 1–10% by weight of polystyrene (III) 3–10% by weight of divinyl benzene and (IV) 20–40% by weight of dialkylphthalate as a plasticizer, said percentages by weight being based on the total solution mixture; said cation exchange groups being bonded to said matrix.

2. A solid unfractured cation exchange resin composition having at least two dimensions each in excess of one cm. and comprising a three dimensionally crosslinked polymer matrix bonded to carboxylic cation exchange groups; said matrix being formed as polymerization product of a solution mixture of (I) 20–80% by weight of a monolefinic compound having the structure of

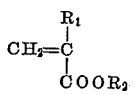

where $R_1$ is a member selected from the group consisting of hydrogen, halogen, and methyl radicals and $R_2$ is a member selected from the group consisting of methyl and ethyl radicals, (II) 1–10% by weight of polystyrene (III) 3–10% by weight of divinyl benzene and (IV) 20–40% by weight of dialklyphthalate as a plasticizer said percentages by weight being based on the total solution mixture; said cation exchange groups being bonded to said matrix after the hydrolysis reaction of said esters.

3. A solid unfractured cation exchange resin composition having at least two dimensions each in excess of one cm. and comprising a three dimensionally crosslinked polymer matrix bonded to carboxylic cation exchange groups; said matrix being formed as a polymerization product of a solution mixture of (I) 20–80% by weight of an olefinic compound having the structure

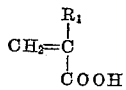

where $R_1$ is a member selected from the group consisting of hydrogen, halogen, and methyl radicals (II) 1–10% by weight of monomeric styrene, (III) 1–10% by weight of polystyrene (IV) 3–10% by weight of divinyl benzene and (V) 20–40% by weight of dialkylphthalate as a plasticizer said percentages by weight being based on the total solution mixture; said cation exchange groups being bonded to said matrix.

4. A solid unfractured cation exchange resin composition having at least two dimensions each in excess of one cm. and comprising a three dimensionally crosslinked polymer bonded to carboxylic cation exchange groups; said matrix being a polymerization product of a solution mixture of (I) 20–80% by weight of a monoolefinic compound having the structure of

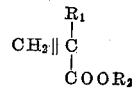

where $R_1$ is a member selected from the group consisting of hydrogen, halogen and methyl radicals and $R_2$ is a member selected from the group consisting of methyl and ethyl radicals, (II) 1–10% by weight of monomeric styrene, (III) 1–10% by weight of polystyrene (IV) 3–10% by weight of divinyl benzene and (V) 20–40% by weight of dialkylphthalate as a plasticizer said percentages by weight being based on the total solution mixture; said cation exchange groups being bonded to said matrix after the hydrolysis reaction of acid esters.

5. The composition defined by claim 1 wherein the number of carbon atoms of alkyl radical of the plasticizer is from 1 to 8.

6. The process for preparing a carboxylic cation exchange resin sheet comprising polymerizing into block form a solution mixture of (I) 20–80% by weight of an olefinic compound having the structure of

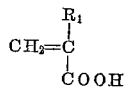

where $R_1$ is a member selected from the group consisting of hydrogen, halogen, and methyl radicals, (II) 1–15% by weight of monomeric styrene, (III) 1–10% by weight of polystyrene (IV) 3–10% by weight of divinyl benzene and (V) 20–40% by weight of dialkylphthalate as plasticizer said percentages by weight being based on the total solution mixture, and slicing the polymerized block form matrix into sheet form matrix.

7. The process for preparing carboxylic cation exchange resin sheet comprising polymerizing into block form a solution mixture of (I) 20–80% by weight of an olefinic compound having the structure of

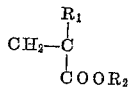

where $R_1$ is a member selected from the group consisting of hydrogen, halogen, and methyl radicals and $R_2$ is a member selected from the group consisting of methyl and ethyl radicals, (II) 1–10% by weight of monomeric styrene, (III) 1–10% by weight of polystyrene (IV) 3–10% by weight of divinyl benzene and (V) 20–40% by weight of dialkylphthalate as a plasticizer said percentages by weight being based on the total solution mixture, slicing the polymerized block form matrix into sheet form matrix, and hydrolyzing said sheet form matrix.

References Cited in the file of this patent

UNITED STATES PATENTS

| | | |
|---|---|---|
| 2,340,110 | D'Alelio | Jan. 25, 1944 |
| 2,340,111 | D'Alelio | Jan. 25, 1944 |
| 2,527,300 | Dudley | Oct. 24, 1950 |
| 2,697,080 | D'Alelio | Dec. 14, 1954 |
| 2,731,408 | Clarke | Jan. 17, 1956 |
| 2,734,044 | Bezman | Feb. 7, 1956 |